July 25, 1933. H. SHARPE 1,919,807

MACHINE FOR MOLDING ARTICLES

Filed Sept. 14, 1929 3 Sheets-Sheet 1

Inventor:
Harry Sharpe.
by
Wright, Brown, Quinby & May
Att'ys.

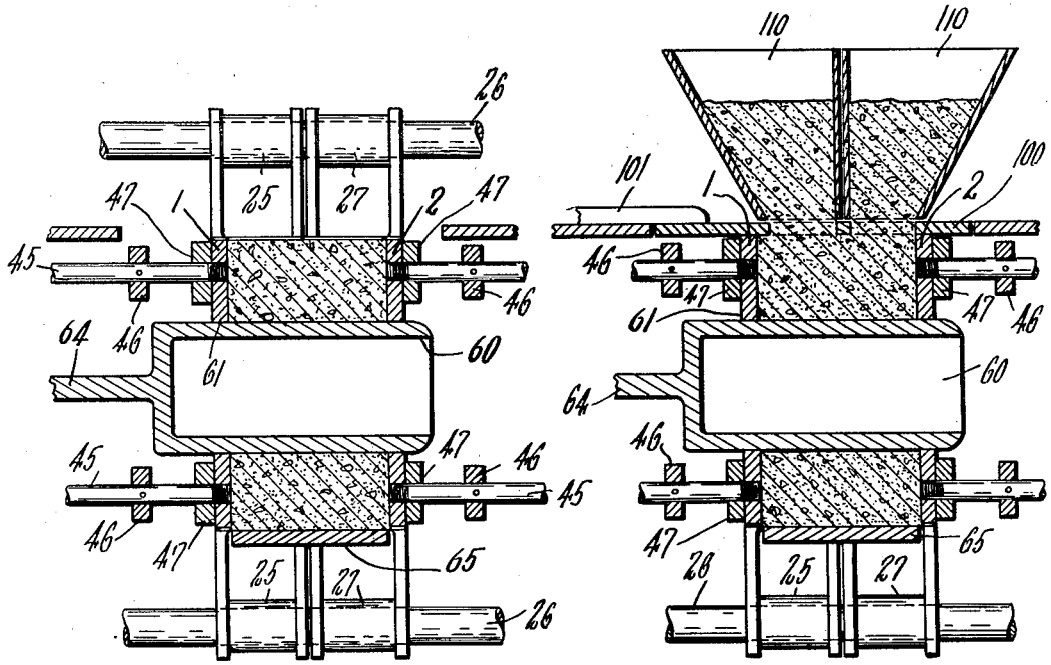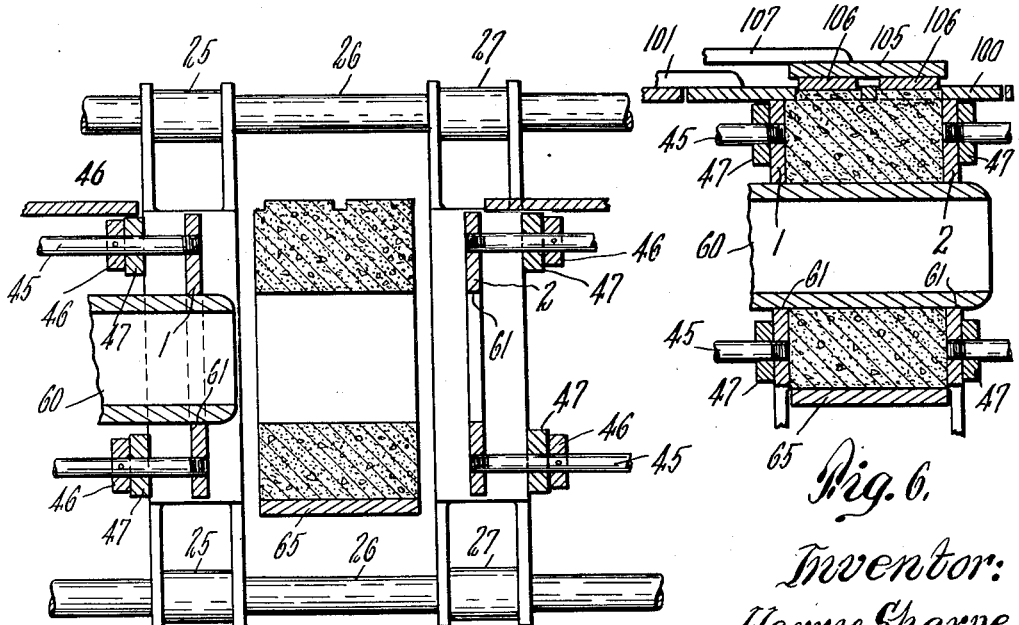

July 25, 1933.  H. SHARPE  1,919,807
MACHINE FOR MOLDING ARTICLES
Filed Sept. 14, 1929  3 Sheets-Sheet 3
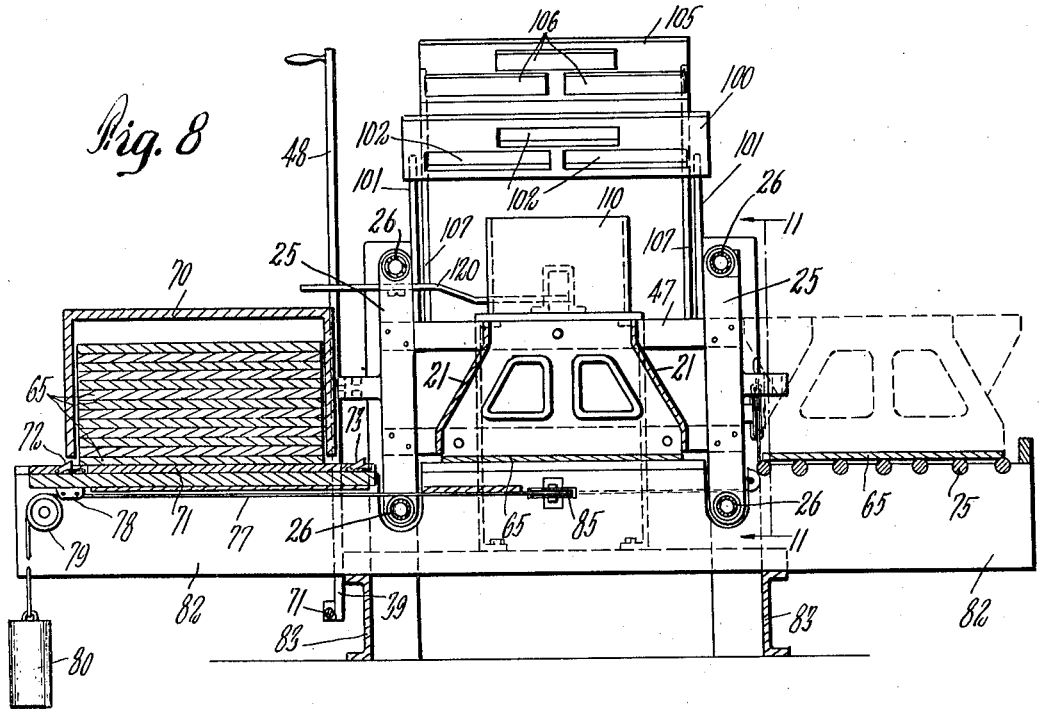
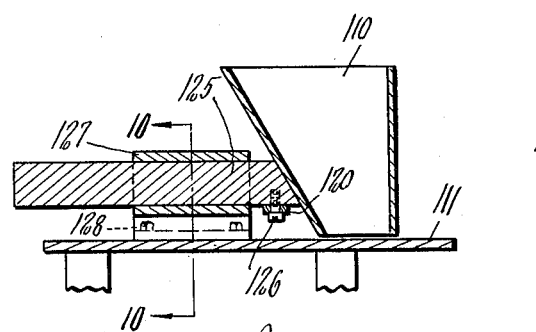
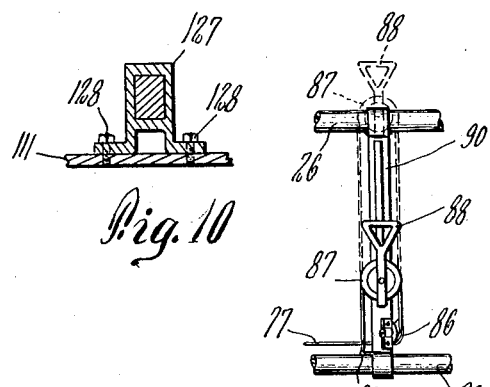
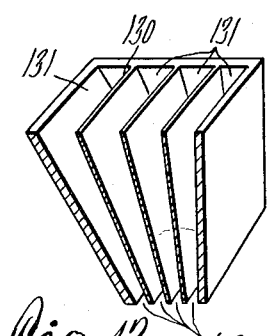
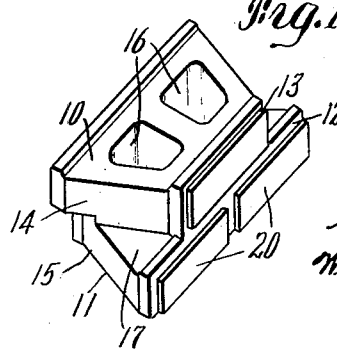
Inventor:
Harry Sharpe.
by Wright Brown Quimby & May
attys.

Patented July 25, 1933

1,919,807

UNITED STATES PATENT OFFICE

HARRY SHARPE, OF BOSTON, MASSACHUSETTS, ASSIGNOR TO ARTHUR B. MARSH, OF MELROSE, MASSACHUSETTS, TRUSTEE

MACHINE FOR MOLDING ARTICLES

Application filed September 14, 1929. Serial No. 392,560.

This invention relates to a method and machine for molding articles from plastic material and while in many respects it is not limited to such service, it is of particular utility in connection with the molding of building blocks of concrete or the like and more especially where a facing material somewhat different from the body of the block is to be used.

One of the important features of the invention relates to the arrangement of the parts and improved mechanism for facilitating the facing of the block either with a single special material or a plurality of different materials and in accordance with which the pattern of the facing may be readily changed as desired without requiring dismantling of other parts of the machine or the making of expensive parts. The facing mechanism is therefore arranged at the top of the machine, any of a plurality of facing patterns of relatively cheap construction being usable at will.

A further feature of the invention relates to the opening and closing mold portion of the machine which operates in such a manner that the corners and edges of the block are protected from damage when the mold is being opened. To this end certain of the walls of the mold are used as stripper plates, remaining in engagement with the newly formed block while the adjacent mold members are removed therefrom.

Further features and novel combinations of parts will appear from a more complete description of the embodiment of the invention shown in the accompanying drawings in which Figure 1 is a side elevation of the machine showing the facing members somewhat raised from operative positions.

Figure 4 is a detail section on line 4—4 of Figure 2.

Figure 5 is a view similar to Figure 4, but showing a portion of the facing mechanism in operation.

Figure 6 is a view similar to a portion of Figure 5, but showing another portion of the facing mechanism in operation.

Figure 7 is a view similar to Figures 4 and 5 but showing the mold open.

Figure 8 is a section on line 8—8 of Figure 1.

Figure 9 is a detail section through certain of the facing mechanism.

Figure 10 is a detail section on line 10—10 of Figure 9.

Figure 11 is a detail in elevation of a portion of the block ejector mechanism.

Figure 12 is a perspective partly in section showing a modified construction of facing material hopper.

Figure 13 is a perspective of a finished block as made by the machine shown.

Figure 1:
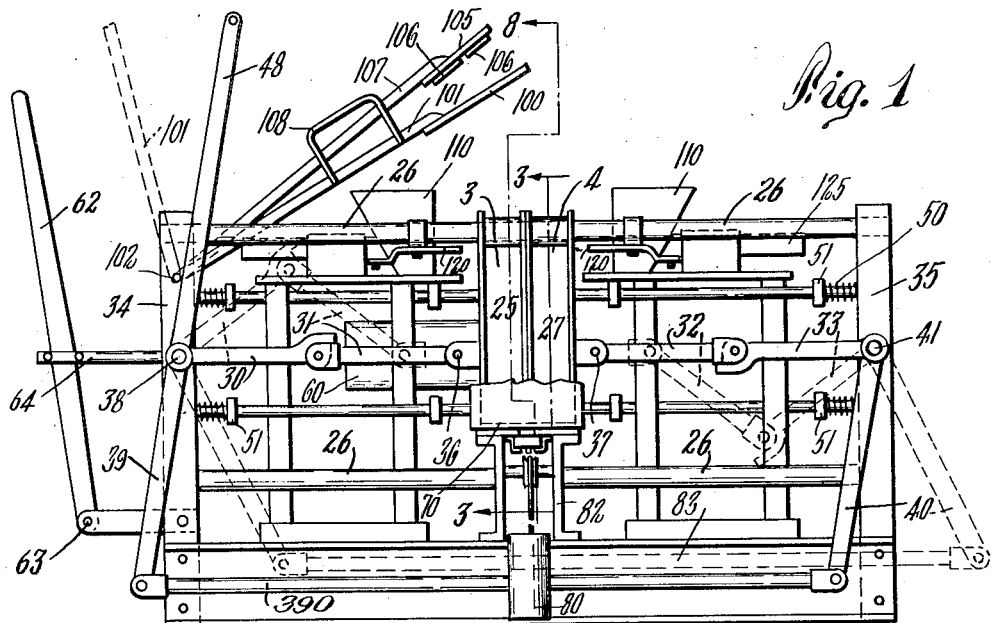

Referring to these drawings, the mold per se comprises a receptacle having a pair of opposed side walls 1 and 2 relatively movable toward and from each other to open and close the receptacle and end walls arranged in pairs as 3 and 4, the units of each pair being movable from and toward each other in the same direction as the side walls. As illustrated this machine is designed to form a block of the type shown in Figure 13, this block comprising a pair of integrally formed upper and lower portions 10 and 11, respectively, each of substantially one-half the total height of the block and each of substantially trapezoidal configuration. One of these sections has the longer of its parallel faces, as at 12, in substantially the same plane as the shorter 13 of the parallel faces of the other section 10, the block having its ends formed by two oppositely inclined beveled faces 14 and 15. As shown also the block is provided with a pair of cored holes 16 extending therethrough between its upper and lower faces. Preferably these blocks are so laid that the lower section of one block will be in the same horizontal plane with the upper section of an endwise adjacent positioned block. These blocks and a wall so constructed therewith form the subject matter of my application for patent Serial No. 345,678, filed March 9, 1929, for Wall construction and unit therefor, and while the machine specifically illustrated in this application is intended to mold blocks of this configuration, by a suitable formation of the end and side wall members, blocks of other configuration might be made by providing side and end walls of appropriate shape, so that the present invention is not limited in its broader aspects to the manufacture of blocks of this precise construction.

This block, as shown in Figure 13, is provided with one finished face simulating the appearance of bricks as laid in a wall with wide joints, these brick-simulating portions being shown at 20 in Figure 13. In order to form these portions, which may be made of finishing material somewhat different from that of the main body of the block, and may be colored if desired, the block is arranged to be molded with these faces upwardly positioned. Consequently as shown best in Figures 2 and 7, each end wall section 3 has a portion 21 shaped to form the inclined face 14 and its short non-inclined end portions, and a face portion 22 formed to shape the face 17 of the block. Each end section 4 has a member 23 shaped to form the end face 10 with its short non-inclined end portions. The two end sections 3 are connected together for simultaneous motion and are carried by bracket members 25 slidably mounted on upper and lower guide rods 26. The two sections 4 are likewise connected together and are similarly mounted on the same guide rods by brackets 27. The sections 3 and 4 are arranged to be moved together in line with their molding faces to close and open the ends of the mold receptacle and as shown toggle links 30, 31 and 32, 33 are provided for this purpose. The outer links 30 and 33 are pivoted respectively to end frames 34 and 35 which also carry the end portions of the guide rods 26. The inner ends of the inner links 31 and 32 are pivoted respectively to bifurcated ears 36 and 37 carried by the connectors 25 for their respective end sections. One of these pairs of toggle links is designed to be broken by upward movement, while the other is broken by downward movement and this breaking and straightening of the toggle links is produced simultaneously as by means of a lever 48. This lever is shown as fixed to the pivot 38 to which is fixed the link 30 and its lower extended end 39 is connected by means of a link 390 to the lower end of an arm 40 fixed to the pivot 41 carrying the toggle arms 33. The pivots 38 and 41 extend across the width of the machine and are connected at their opposite ends from the lever 48 by means of arms 42 and 43 and a link 44.

Movement of the lever 48 in a direction to separate the end wall portions may also be utilized to separate the side wall portions, but it is desirable that these side wall portions be held in closed position until after the opening motion of the end walls has been commenced, thus to act as stripping plates to hold the freshly molded block while the end plates are being removed therefrom. For this reason the end walls are shown as supported in position by bars 45, each fixed to one side wall and each of which may have a stop 46 thereon which stops are contacted by connecting frames 47 of the end sections when they have been partially opened, whereupon further opening motion pulls on the bars 45 and causes the side plates to be pulled away from each other to release the molded block as shown in Figure 7. Closing and locking of the mold members, as well as unlocking and opening thereof, are thus each accomplished by a single actuation of the lever 48.

The side members are held against separation until the end members contact with the stops as by means of springs 50 surrounding the rods 45 and reacting between collars 51 fixed thereon and end members 52 of the machine frame.

In order that the holes 16 may be formed through the block, core members as 60 may be employed as shown best in Figures 4 to 7. These members are slidable through suitable openings 61 in the side members 1 and 2 and are movable so as to be withdrawn, after the block has been molded therearound, by any suitable means, herein shown in Figure 1, however, as a hand lever 62 pivoted at 63 to a portion of the machine frame and engaging a pull rod 64 extending from the core members. After the molding operation, these core members are first retracted, while the side walls 1 and 2 act as stripping members therefor, after which the end members are retracted and then the side members are opened as previously explained.

Figure 2:
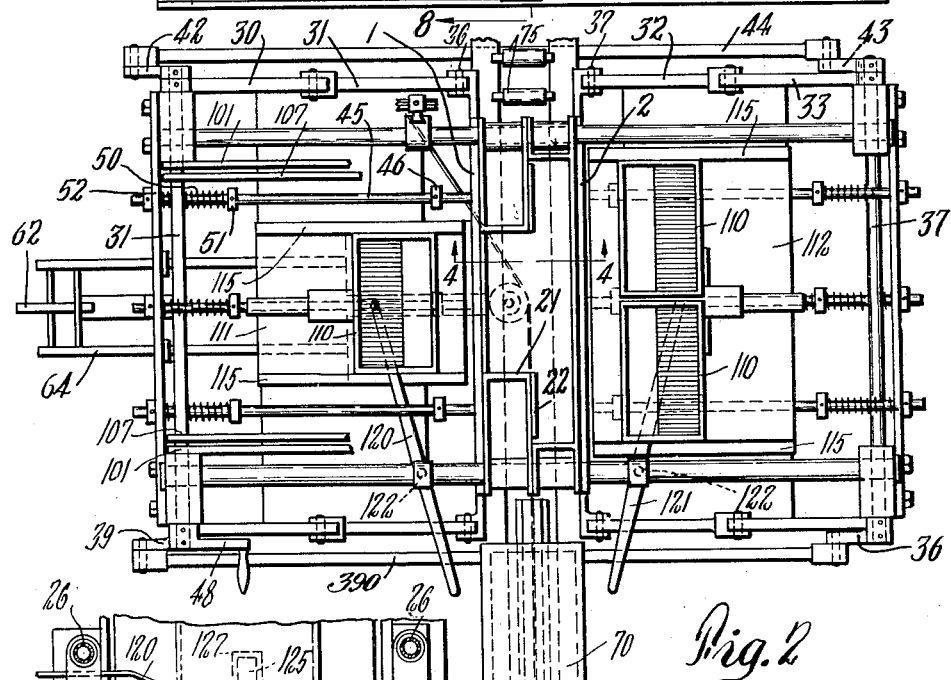
Figure 2 is a top plan of the same, the facing members being broken away.
Figure 3:
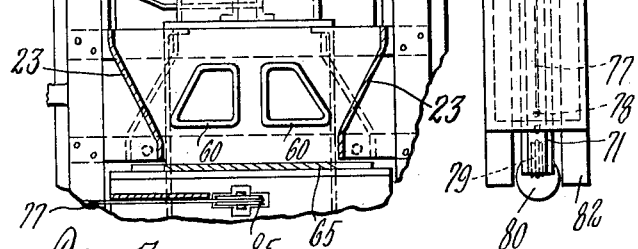
Figure 3 is a detail section on line 3—3 of Figure 1.

The bottom of the molding receptacle is formed by a removable pallet 65 and as shown best in Figure 7 there are a plurality of such pallets which may be fed in one at a time into position between the side and end wall members to support the plastic material during the molding operation, and after the molding operation has been completed and the receptacle is open, the pallet with the molded article thereon is moved out from cooperative relation to the side and end wall members and another pallet is moved into position to receive another charge of plastic material. The molded block is removed from the molding receptacle between the abutting sectional end walls at one end which are separated sufficiently when the mold is open for the passage of the block therebetween. Referring to Figures 2 and 8, it will be seen that the pallets are arranged in a stack on a supporting platform 70 which has a lateral guideway therein in which is slidably mounted a feeding member 71. This feeding member 71 has a pair of latch elements 72 and 73 thereon which extend upwardly through a slot in the platform. When the member 71 is in its retracted position as shown in Figure 8, the latch element 72 is positioned outwardly of the lowest pallet of the stack in position to engage this lowest pallet and push it out from the stack on traverse of the member 71 toward the molding receptacle. The latch element 73 is positioned inwardly of the stack and when the member 71 is given its traversing motion to remove a pallet from the stack this latch element 73 impinges on the pallet beneath the molding receptacle. Continued traverse of the member 71 sufficient to present the last removed pallet into cooperative relation with the molding receptacle causes the pallet previously in that position, and which carries the molded block from a previous molding operation to be moved onto a suitable support, such as the roller carrier 75, from which each pallet with its load of material may be removed for drying and setting, whereupon the blocks may be removed from the pallet and the pallets returned to the stack for later use. As shown in Figure 8 the means for effecting such traverse of the member 71 comprises a cable 77 fixed at 78 to the member 71 and having one end passing over a pulley 79 and having fixed to its end a suitable means for biasing the member 71 to its retracted position. As shown this means comprises a weight 80 attached to the outer end of the cable. As shown the molding receptacle and the stack are held in elevated position by suitable foundation members 82 and 83 to bring the molding mechanism at a convenient height for the operator, and if desired, to provide sufficient space for movement of the weight 80.

The cable 77, as shown, leads from its attachment 78 with the member 71 about suitable guide pulleys 85 and 86 (see Figure 11) about a pulley 87 to which is secured a pull handle 88, the end of the cable beyond the pulley 87 being fixed to any suitable point as at 89 to the machine frame. This pulley 87 with its handle are mounted to slide on a suitable upright guide member 90 and by pulling the handle up to the dotted line position shown in Figure 11, the member 71 is moved to take the lowest pallet from the stack and to move it into cooperative relation to the molding receptacle and to move the pallet previously in such cooperative relation with its molded block onto the roller support 75. By means of the pulley 87 about which the cable passes the distance through which the handle 88 must be pulled to effect the desired amplitude of motion of the member 71 is reduced to one half the travel of the member 71, thus making the mechanism more convenient for the operator.

A pallet being in position beneath the mold members and the mold members then being closed, some of the plastic material is placed in the receptacle thus formed and tamped into position. Thereupon the core members 60 are moved into place and the receptacle is then completely filled with the plastic material. If desired, however, plastic material may be supplied to the molding receptacle under pressure by any suitable means (not shown) but in accordance with methods well known in the art, and if this is done the core members may be placed in position before any plastic material is supplied to the receptacle. When the receptacle has been filled to the top with the desired plastic material for the main body of the block the mechanism for applying a facing to the block is then brought into action. As shown this mechanism comprises a cover member 100 which as shown is fixed to one end of each of a pair of supporting arms 101, the ends of which are pivoted at 102 to one of the end frames as 34 of the molding machine. This cover 100 is provided with one or more perforations shaped in accordance with the desired shape of the ornamental facing to be given the block. For example, as shown in Figure 8, this member 100 is provided with three openings 102 shaped to simulate the edges of bricks as laid in a wall with wide joints therebetween represented by unperforated portions of the cover 100 therebetween. These openings 102 represent, as shown, edge faces of two bricks in one course and the edge face of one brick in a superposed course, breaking joints with the bricks of the course beneath. Any desired configuration or contour of perforations may be employed to suit the particular design of face finish which it is desired to produce. Cooperating with the cover 100 is an upper cover member 105, which as best shown in Figure 1, is provided with one or more projections 106 shaped and positioned to conform to the openings 102 through the cover 100 and having lower faces which may be ornamented if desired and which determine the surface appearance of those portions of the facing which project through the openings of the cover 100 when the cover is in closed position. This upper cover member 105 is also shown as fixed to the ends of arms 107 which are also pivoted to the end of the end frame at 102 to facilitate manipulation of these two cover members. Each of the arms 101, as shown, may be provided with a pull handle as 108. After the mold receptacle has been filled with the plastic of which the body portion of the block is to be formed, the cover 100 is then dropped into position thereover and facing material of the desired character is then applied to the upper face of the cover 100 to pass through the openings therein and bond with the main body of material within the molding receptacle. The cover 105 is then swung down so that the members 106 tamp the facing plastic into position and give the desired face finish thereto in accordance with the finish of the faces of these projections 106. Usually it will be found desirable to permit the cover member 105 to drop into position so as to strike the finish plastic material a tamping blow and the projections 106 are preferably of sufficient thickness so that when this tamping has been effected the main portion of the cover 105 is slightly above the upper face of the cover 100. Thus when the cover 100 is raised by pulling on the handles 108, these projections 106 act as strippers to permit the side walls of the perforations 102 to become detached from the plastic material, whereupon further lifting of the cover 100 causes this cover to impinge on the lower face of the cover 105, whereupon both may be raised together and fully retracted from the molded block. The fully retracted position of the arms 101 and 107 is shown in dotted lines in Figure 1. It will be noted that the joint simulating parts of the facing come opposite to the imperforate parts of the cover 100 where no facing material is applied. They thus present the color of the material of which the body of the block is composed. By forming the facing of the block in this manner, changes in design of facing may be readily effected by substituting for cover members of one contour members having a different contour. These members may be cheaply formed and may be substituted in the machine very easily since they are always accessible, and only one pair of cooperating members is necessary for each design. Where the facing is made on the bottom of the blocks as heretofore commonly practiced, it is necessary to form pallets having such facial contours and sufficient of these for each design must be provided to permit of a constant supply of new pallets and yet permit the blocks to remain sufficiently long thereon to set before they are removed. By applying the facing on the upper faces of the blocks as they are molded as herein shown it will be seen that great economy may be effected since only plain faced pallets are necessary and only a single pair of cooperating covers for each special configuration or facing is required.

In Figures 1, 2, 5, 8, 9 and 12 means have been illustrated to facilitate the supplying of facing material. To this end hoppers such as 110 are shown, which may be moved into and out of position above the openings through the cover plate 100. These hoppers are open at their lower ends and when out of cooperative relation with the molding receptacle rest upon imperforate platforms as 111 and 112, the inner edges of which are positioned to just clear the edges of the cover 100 when it is dropped in between them into position over the molding receptacles. The upper faces of the platforms 111 and 112 are on a level with the upper face of the cover member 100 when this cover member is in its operative position. These hoppers 110 may receive the facing material in plastic condition and when the cover 100 is in operative position they may be slid over their respective platforms and onto the upper face of the cover 100, whereupon the plastic material contained therein may flow down through the cover perforations onto the plastic material already in the receptacle and which forms the body of the molded block. As shown these hoppers are mounted between suitable guides 115 on their respective platforms and have attached thereto the inner ends of levers 120, 121, which are pivoted as at 122 to one of the guide rods 26. As soon as the facing plastic has flowed down through the openings in the cover as shown in Figure 5, the hoppers may be retracted, their inner edges acting to cut off the flow of plastic material level with the upper face of the cover 100. The upper cover member 105 may then be dropped in position as heretofore described. The attachment of the levers 120, 121 to the hoppers may be done as illustrated in Figure 9, the hopper being provided with a suitable guide bar 125 to which the inner end of the lever is directly pivoted as at 126, this guide bar passing through a guide bracket 127, as shown in Figures 9 and 10, which is fixed as by screws 128 to the upper face of the platform 111 or 112.

In some cases it may be desirable to apply facing material of a variety of colors to the same projecting face portion. This may be done by providing the hopper to receive the facing material with a plurality of partitions, as shown at 130 in Figure 12, defining with the side walls of the hopper a plurality of compartments 131 each of which is open at its lower end as at 132 and which may be filled with the facing material of the different colors. Due to the sliding of the supply hoppers over the cover 100 the material in these several compartments 130 are somewhat blended on their surface portions so as to produce a more or less shaded effect from one to another. By supplying different colored materials to the different hoppers a great variety of colored facings may be produced as desired.

From the foregoing description of certain embodiments of this invention it should be evident to those skilled in the art that various changes and modifications might be made without departing from its spirit or scope as defined by the appended claims.

I claim:

1. In a machine of the class described, a molding receptacle having an open top, a cover for said top apertured to the contour of a desired finished face of the molded article, means for applying facing material to the top face of said cover to pass through said aperture and bond with the article in said receptacle, and a member having a projection shaped to fit in said aperture and form the top face of said facing material.

2. In a machine of the class described a molding receptacle having an open top, a cover for said top hinged adjacent thereto and apertured to the contour of a desired finished face of the molded article, means for applying facing material to the top face of said cover to pass through said aperture and bond with the article in said receptacle, and a member also hinged adjacent to said top and movable on its hinges relative to said cover, said member having a projection shaped to fit in said aperture and form the top face of said facing material.

3. In a machine of the class described, a molding receptacle having an open top, a cover for said top apertured to the contour of a desired finished face of the molded article, means for applying facing material to the top face of said cover to pass through said aperture and bond with the article in said receptacle, and a member having a projection shaped to fit in said aperture and form the top face of said facing material, said member overlying said cover and spaced therefrom when said member and cover are in operative position whereby when said cover is lifted said member acts as a stripper until it is contacted by said cover.

4. A molding machine comprising a receptacle having relatively movable side and end walls, each of said end walls comprising a pair of portions movable toward and from each other, and when moved together forming with said side walls a space to receive plastic material, and means for moving said portions apart while said side walls remain stationary and act as strippers and thereafter to separate said side walls to free the molded block.

5. A molding machine comprising a receptacle having relatively movable side and end walls, a core member extending through an opening through one of said side walls and to the opposite side wall to form a passage through a block molded by said machine, means actuable after the completion of the molding operation to withdraw said core member through said opening to cause said one side wall to act as a stripper plate to free the block from said core member, means for moving said end walls laterally of said side walls to cause said side walls to act as strippers to free the block from said end walls, and means for then retracting said side walls to free the molded block therefrom.

6. A molding machine comprising side and end walls relatively movable between open and closed positions, means for feeding a pallet beneath said walls to form the bottom of a receptacle therewith when said walls are in closed position, means for opening said walls after the molding operation leaving the molded material on said pallet, and means for simultaneously moving said pallet with said block between certain of said walls out of molding position and another pallet into position prior to a succeeding molding operation.

7. A molding machine comprising separable wall members defining a receptacle having an open bottom to receive plastic material to be molded, a pallet for closing the bottom of said receptacle, and means actuable after a molding operation to separate certain of said wall members in line with their molding faces sufficiently to permit the molded block supported on said pallet to be removed from said receptacle between said certain members.

8. A molding machine having a receptacle provided with end and side wall members, means for moving said side wall members from each other to free them from a block molded in said receptacle, means for moving said end wall members parallel to the movements of said side wall members and before said side wall members are moved from each other thereby to free said end wall members from said block while said side members act as strippers, and means for removing the molded block from one end of said receptacle after said side members have been moved from each other.

HARRY SHARPE.